United States Patent
Chung

(10) Patent No.: US 8,294,972 B2
(45) Date of Patent: Oct. 23, 2012

(54) DISPLAY DEVICES

(75) Inventor: Hyun-jong Chung, Hwaseong-si (KR)

(73) Assignee: Samsung Electronics Co, Ltd., Gyeonggi-do (KR)

( * ) Notice: Subject to any disclaimer, the term of this patent is extended or adjusted under 35 U.S.C. 154(b) by 74 days.

(21) Appl. No.: 12/654,006

(22) Filed: Dec. 8, 2009

(65) Prior Publication Data

US 2010/0157408 A1 Jun. 24, 2010

(30) Foreign Application Priority Data

Dec. 8, 2008 (KR) .................. 10-2008-0124289
Jun. 16, 2009 (KR) .................. 10-2009-0053493

(51) Int. Cl.
*G02F 1/03* (2006.01)
*G02F 1/29* (2006.01)

(52) U.S. Cl. ........ 359/263; 359/245; 359/318; 359/586; 349/106; 349/142; 349/201

(58) Field of Classification Search .................. 359/240, 359/244, 245, 255, 263, 277, 315, 318; 315/287; 349/106, 201; 136/256; 427/64, 69; 257/29, 257/E21.158
See application file for complete search history.

(56) References Cited

U.S. PATENT DOCUMENTS

| | | | | |
|---|---|---|---|---|
| 4,317,155 A | * | 2/1982 | Harada et al. ................. | 361/120 |
| 5,240,762 A | * | 8/1993 | Miura et al. .................. | 428/220 |
| 5,943,154 A | * | 8/1999 | Nakayama .................... | 359/244 |
| 6,008,872 A | * | 12/1999 | den Boer et al. ............... | 349/106 |
| 6,608,653 B2 | * | 8/2003 | Shiga et al. .................... | 349/43 |
| 6,618,104 B1 | * | 9/2003 | Date et al. ...................... | 349/86 |
| 6,667,785 B2 | * | 12/2003 | Stephenson .................... | 349/86 |
| 6,707,515 B1 | * | 3/2004 | Ide et al. ........................ | 349/74 |
| 6,774,970 B1 | * | 8/2004 | Sekiguchi ..................... | 349/142 |
| 6,790,502 B1 | * | 9/2004 | Yamamoto et al. .......... | 428/64.1 |
| 6,819,393 B1 | * | 11/2004 | Date et al. ..................... | 349/201 |
| 6,836,314 B2 | * | 12/2004 | Date et al. ..................... | 349/201 |

FOREIGN PATENT DOCUMENTS

| | | |
|---|---|---|
| JP | 07-028104 | 1/1995 |
| KR | 10-2002-0026646 | 4/2002 |
| KR | 10-2004-0011621 | 2/2004 |
| KR | 10-2004-0092373 | 11/2004 |

* cited by examiner

*Primary Examiner* — Loha Ben

(74) *Attorney, Agent, or Firm* — Harness, Dickey & Pierce, P.L.C.

(57) ABSTRACT

A display device may include a substrate, a thin film layer formed on the substrate and/or having a light absorptance that varies according to an electric field applied to the thin film layer, and/or electrodes disposed to apply the electric field to the thin film layer and/or configured to change the electric field applied to the thin film layer.

20 Claims, 3 Drawing Sheets

FIG. 5

| ABSORPTION | TRANSMISSION OR REFLECTION |
|---|---|
| WHEN FERMI LEVEL IS AT DIRAC POINT, LIGHT OF ALL WAVELENGTHS MAY BE ABSORBED | WHEN FERMI LEVEL IS ABOUT 2eV LOWER OR HIGHER THAN DIRAC POINT, LIGHT MAY NOT BE ABSORBED |

DISPLAY DEVICES

CROSS-REFERENCE TO RELATED APPLICATION(S)

This application claims priority from both Korean Patent Application No. 10-2008-0124289, filed on Dec. 8, 2008, and from Korean Patent Application No. 10-2009-0053493, filed on Jun. 16, 2009, both in the Korean Intellectual Property Office (KIPO), the entire contents of both of which are incorporated herein by reference.

BACKGROUND

1. Field

Example embodiments relate to display devices using thin film layers having light absorptance that varies according to electric fields.

2. Description of the Related Art

Display devices may use light transmission. Since display devices using light transmission may include transparent transistors in order to adjust light transmission, there may be limitations in selecting materials used to manufacture such display devices. Also, if such display devices are used outdoors, backlight units may not be bright enough for user to see the display devices clearly, thereby making it difficult to actually use the display devices.

SUMMARY

Example embodiments may include display devices using thin film layers having light absorptance that varies according to applied electric fields.

According to example embodiments, a display device may include a substrate, a thin film layer formed on the substrate and having light absorptance that may vary according to an electric field applied to the thin film layer, and electrodes disposed to apply an electric field to the thin film layer and changing the electric field applied to the thin film layer.

The thin film layer may include a material having a bandgap energy of 1.7 eV or less.

The thin film layer may include a graphene layer or a graphite layer.

The thin film layer may include a carbon thin film layer.

The carbon thin film layer may include a graphene layer or a graphite layer.

The display device may further include an insulating layer disposed between the thin film layer and the electrodes.

The display device may further include a transparent layer disposed on the thin film layer. The transparent layer may be a protective layer.

The electrodes may be metal electrodes. The electrodes may act as one or more mirrors.

According to example embodiments, a display device may include a substrate, a thin film layer formed on the substrate and having a light absorptance that may vary according to an electric field applied to the thin film layer, electrodes disposed to apply an electric field to the thin film layer and changing the electric field applied to the thin film layer, an insulating layer disposed between the thin film layer and the electrodes, and a transparent protective layer disposed on the thin film layer.

The electrodes may be metal electrodes. The electrodes may act as one or more mirrors.

The display device may further include one or more color filters disposed on the thin film layer. The color filters may be, for example, one or more of red, green, and blue. The color filters may be, for example, one or more of cyan, magenta, yellow, and black.

The display device may further include a driving circuit disposed between the substrate and the thin film layer. The driving circuit may have at least one portion including opaque material.

The substrate may be a silicon substrate. The driving circuit may have at least one portion including an opaque material including silicon.

Since information may be displayed by adjusting a light reflectance using a thin film layer that may have a light absorptance that may vary according to an electric field, an opaque material may be used or an opaque element may be disposed in the back of a display device. For example, a silicon substrate may be used and a driving circuit may be disposed in the back of the display device. Once the driving circuit is disposed in the back of the display device, not in a peripheral area of the display device, the size of the display device may be reduced, making it possible to simplify the display device. Also, if a carbon thin film layer, such as a graphene layer or a graphite layer, is used as the thin film layer, a low temperature process may be performed and the display device may be easily used for flexible display applications. Furthermore, since light reflection may be used, the display device may be used outdoors.

According to example embodiments, a display device may include a substrate, a thin film layer formed on the substrate and having a light absorptance that varies according to an electric field applied to the thin film layer, and electrodes disposed to apply the electric field to the thin film layer and configured to change the electric field applied to the thin film layer.

BRIEF DESCRIPTION OF THE DRAWINGS

The above and other aspects and advantages will become more apparent and more readily appreciated from the following detailed description of example embodiments, taken in conjunction with the accompanying drawings, in which:

FIG. 5 is a diagram for explaining the absorption, transmission, or reflection of a thin film layer of the display device of FIG. 1.

DETAILED DESCRIPTION

Figure 1:
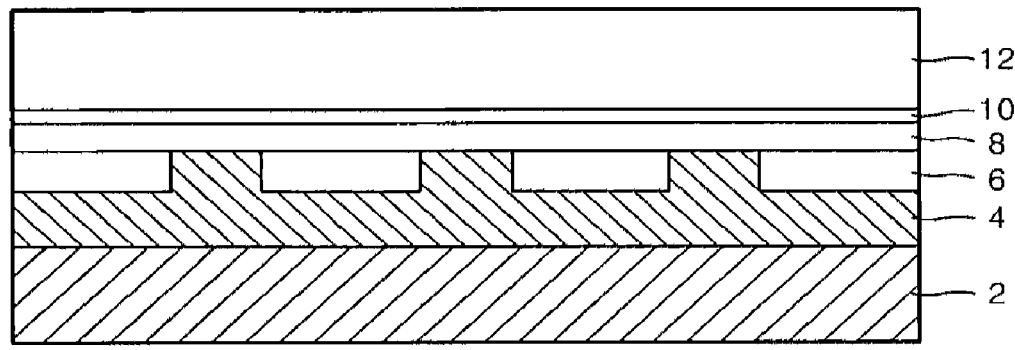
FIG. 1 is a cross-sectional view of a display device using a thin film layer having a light absorptance that varies according to an electric field, according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and sections, these elements, components, regions, layers, and sections should not be limited by these terms. These terms are only used to distinguish one element, component, region, layer, and section from another element, component, region, layer, and section. For example, a first element, component, region, layer, and section could be termed a second element, component, region, layer, and section without departing from the teachings of example embodiments.

Spatially relative terms, such as "beneath," "below," "lower," "above," "upper," and the like may be used herein for ease of description to describe the relationship of one component and feature to another component and feature, or other component(s) and feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and components, but do not preclude the presence or addition of one or more other features, integers, steps, operations, elements, and components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a cross-sectional view of a display device using a thin film layer 10 having a light absorptance that varies according to an electric field, according to example embodiments.

Referring to FIG. 1, the display device may include a substrate 2, the thin film layer 10 formed on the substrate 2, and electrodes 6 disposed to apply an electric field to the thin film layer 10. An insulating layer 8 may be disposed between the thin film layer 10 and the electrodes 6. A transparent layer 12 may be disposed on the thin film layer 10. The transparent layer 12 may be a protective layer The thin film layer 10 may have a light absorptance that varies according to an electric field applied to the thin film layer 10. The thin film layer 10 may include a material having a bandgap energy of 1.7 eV or less. For example, the thin film layer 10 may include a carbon thin film layer, such as a graphene layer or a graphite layer. When the material of the thin film layer 10 has a bandgap of less than about 1.7 eV, the material may absorb all wavelengths of red (R), green (G), and blue (B) light. However, when the material of the thin film layer 10 has a bandgap energy of greater than about 1.7 eV, the material may not, for example, absorb wavelengths of R light. Accordingly, when the thin film layer 10 includes a material having a bandgap energy of less than 1.7 eV, the light absorptance of the thin film layer 10 may vary according to an electric field applied to the thin film layer 10.

According to the intensity of an electric field applied to the thin film layer 10, the thin film layer 10 may absorb, transmit, or reflect light incident on the thin film layer 10.

Accordingly, when the electrodes 6 are disposed to act as one or more mirrors, since the electrodes 6 may reflect light passing through the thin film layer 10, the display device may be a reflective display device. In order for the electrodes 6 to act as one or more mirrors, the electrodes 6 may be metal electrodes. For example, the electrodes 6 may be formed of material including aluminum (Al).

The electrodes 6, which may be gate electrodes, may have a two-dimensional array structure in such a manner that a unit electrode forms one pixel or one sub-pixel during color display.

When the display device is a reflective display device by enabling the electrodes 6 to act as a mirror, the back of the display device behind the electrodes 6 may not have to be transparent.

Accordingly, a driving circuit 4 may be disposed between the electrodes 6 and the substrate 2 in order to control the pixels of the display device. Since the driving circuit 4 may not have to be transparent, at least one portion of the driving circuit 4 may be formed of opaque material. For example, the substrate 2 may be a silicon substrate and the driving circuit 4 may have at least one portion formed of an opaque material including silicon.

The insulating layer 8 may be thin and transparent. For example, the insulating layer 8 may be formed of a material including aluminum oxide. The transparent layer 12 may be formed of glass. For example, the display device of FIG. 1 may be obtained by sequentially stacking the driving circuit 4, the electrodes 6, the insulating layer 8, and the thin film layer 10 on the substrate 2, and attaching the transparent layer 12 formed of glass to the thin film layer 10.

For example, the display device of FIG. 1 may be obtained as follows.

First, the driving circuit 4 may be formed on the substrate 2, for example, an opaque substrate such as a silicon substrate. Since the display device of FIG. 1 may display images by adjusting a light absorptance to adjust a light reflectance, the driving circuit 4 may be formed on the substrate 2. Next, the electrodes 6, which may be gate electrodes, may be formed of metal, such as aluminum, on the driving circuit 4. In example embodiments, the electrodes 6 may be formed of aluminum, but example embodiments are not limited thereto, and the electrodes 6 may be formed of any of various metal materials. The electrodes 6 may have a function of applying an electric field to the thin film layer 10 and may have a function of acting as one or more mirrors. The insulating layer 8 may be formed on the electrodes 6 and may be formed of, for example, aluminum oxide. The thin film layer 10 may be formed on the insulating layer 8. The thin film layer 10 may be formed of material including graphene or graphite. The transparent layer 12 may be formed, for example, of transparent glass.

Figure 2:
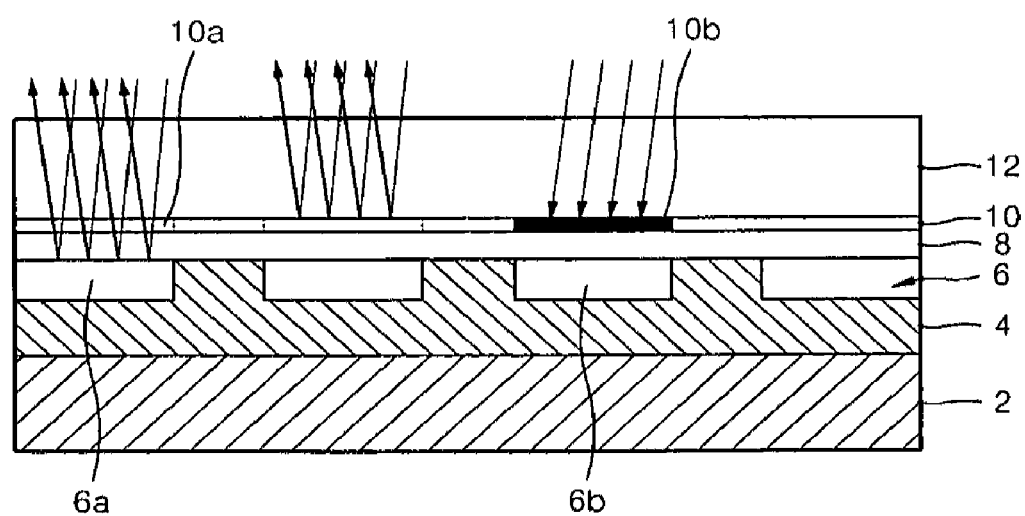
FIG. 2 is a cross-sectional view for explaining an operating principle of the display device of FIG. 1.

FIG. 2 is a cross-sectional view for explaining an operating principle of the display device of FIG. 1.

Referring to FIG. 2, a voltage may be applied to a left electrode 6a of the electrodes 6 in order to form an electric field where a portion 10a of the thin film layer 10 corresponding to the left electrode 6a of the electrodes 6 may transmit or reflect light. A voltage may be applied to a right electrode 6b of the electrodes 6 in order to form an electric field where a portion 10b of the thin film layer 10 corresponding to the right electrode 6b of the electrodes 6 may absorb light. As shown in FIG. 2, when the portion 10b of the thin film layer 10 absorbs light, since the light is not reflected, the portion 10b of the thin film layer 10 may appear black. When the portion 10a of the thin film layer 10 transmits or reflects light, since the light is reflected by the left electrode 6a of the electrodes 6 or the portion 10a of the thin film layer 10, the portion 10a of the thin film layer 10 may appear bright.

The display device of FIG. 1 may operate in two operation modes. In a transmission and reflection mode, the display device may provide bright display, and may provide white display according to the transparent layer 12. When the display device is in an absorption mode, the display device may provide black display. Desired information, e.g., a picture or a letter, may be displayed using these two operation modes.

Figure 3:
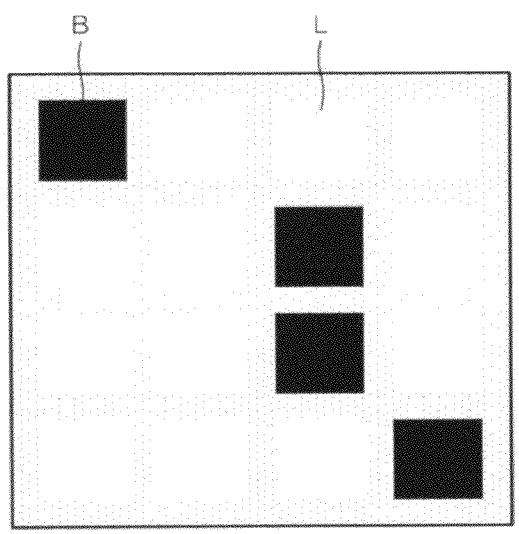
FIG. 3 is a top plan view for explaining two operation modes of the display device of FIG. 1.

FIG. 3 is a top plan view for explaining two operation modes of the display device of FIG. 1.

Referring to FIG. 3, when looking down at the display device, based on the operating principle of the display device, each electrode portion in an array of the electrodes 6 may be a unit pixel. Some of the electrodes 6 may be shown as bright regions L. Some of the electrodes 6 may be shown as black regions B. Accordingly, a black-and-white electronic paper (E-paper) or the like may be realized using the display device of FIG. 1, that may be constructed as described above.

Figure 4:
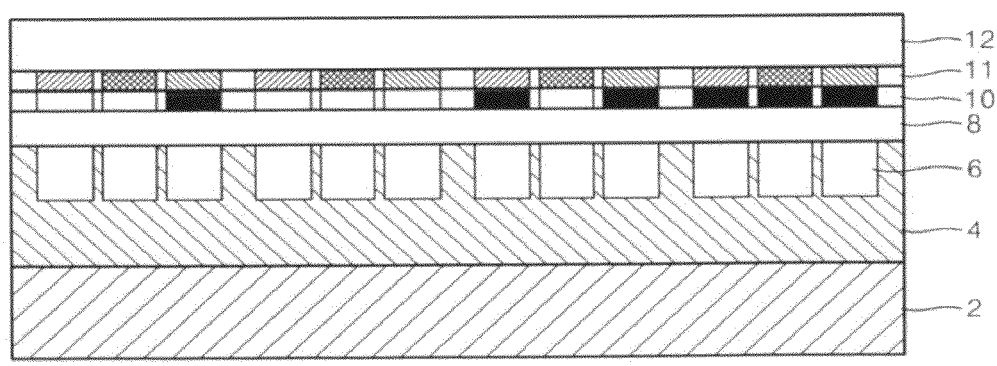
FIG. 4 is a cross-sectional view illustrating a case in which a color filter is added to the display device of FIG. 1 for color display.

FIG. 4 is a cross-sectional view illustrating a case in which a color filter 11 is added to the display device of FIG. 1 for color display.

Referring to FIG. 4, differently from FIG. 1, one or more color filters 11 may be disposed between the thin film layer 10 and the transparent layer 12. The one or more color filters 11 may make it possible to realize a color E-paper or the like using the display device. The electrodes 6, the driving circuit 4, and the color filter 11 may be disposed so that each pixel may have, for example, three color components (e.g., red (R), green (G), and blue (B)), or may have, for example, four color components (e.g., cyan (C), magenta (M), yellow (Y), and black (K)). In FIG. 4, each pixel may have exemplarily 3 color components (e.g., R, G, and B).

When the display device of FIG. 1 or 4 is formed on a silicon substrate, a silicon process may be used.

FIG. 5 is a diagram for explaining the absorption, transmission, or reflection of the thin film layer 10 of the display device of FIG. 1.

Referring to the left of FIG. 5, when the Fermi level $E_F$ of a material (e.g., graphene) used to form the thin film layer 10 is at the Dirac point $E_D$, the thin film layer 10 may absorb light of all wavelengths. However, referring to the right of the diagram of FIG. 5, when a voltage is applied to the electrodes 6 in order to apply an electric field such that the Fermi level is about 2 eV lower or higher than the Dirac point, carriers for absorbing light no longer exist and the thin film layer 10 may no longer absorb light. In this case, the thin film layer 10 may transmit or reflect the light.

While example embodiments have been particularly shown and described, it will be understood by those of ordinary skill in the art that various changes in form and details may be made therein without departing from the spirit and scope of the present invention as defined by the following claims.

What is claimed is:

1. A display device, comprising:
   a substrate;
   a thin film layer formed on the substrate and having a light absorptance that varies according to an electric field applied to the thin film layer, the thin film layer comprising a carbon thin film layer; and
   electrodes adjacent to at least one of the substrate and the thin film layer,
   the electrodes disposed to apply the electric field to the thin film layer, and configured to change the electric field applied to the thin film layer.

2. The display device of claim 1, wherein the thin film layer comprises material having a bandgap energy of 1.7 eV or less.

3. The display device of claim 2, wherein the thin film layer comprises a graphene layer or a graphite layer.

4. The display device of claim 1, wherein the thin film layer comprises a graphene layer or a graphite layer.

5. The display device of claim 1, further comprising an insulating layer disposed between the thin film layer and the electrodes.

6. The display device of claim 1, further comprising a transparent layer disposed on the thin film layer.

7. The display device of claim 1, wherein the electrodes are metal electrodes configured to act as one or more mirrors.

8. The display device of claim 1, further comprising one or more color filters disposed on the thin film layer.

9. The display device of claim 1, further comprising:
   a driving circuit disposed between the substrate and the thin film layer;
   wherein the driving circuit comprises at least one portion comprising opaque material.

10. The display device of claim 9, wherein the substrate is a silicon substrate, and
    wherein the opaque material comprises silicon.

11. The display device of claim 1, further comprising:
    an insulating layer disposed between the thin film layer and the electrodes; and
    a transparent layer disposed on the thin film layer.

12. The display device of claim 11, wherein the electrodes are metal electrodes configured to act as one or more mirrors.

13. The display device of claim 11, wherein the thin film layer comprises material having a bandgap energy of 1.7 eV or less.

14. The display device of claim 13, wherein the thin film layer comprises a graphene layer or a graphite layer.

15. The display device of claim 11, wherein the thin film layer comprises a graphene layer or a graphite layer.

16. The display device of claim 11, further comprising one or more color filters disposed on the thin film layer.

17. The display device of claim 11, further comprising:
    a driving circuit disposed between the substrate and the thin film layer;
    wherein the driving circuit comprises at least one portion comprising opaque material.

18. The display device of claim 17, wherein the substrate is a silicon substrate, and
    wherein the opaque material comprises silicon.

19. The display device of claim 1, wherein the electrodes are between the substrate and the thin film layer.

20. The display device of claim 11, wherein the electrodes are between the substrate and the thin film layer.

* * * * *